US010385706B2

United States Patent
Blanchard et al.

(10) Patent No.: US 10,385,706 B2
(45) Date of Patent: Aug. 20, 2019

(54) ROTARY ASSEMBLY FOR A TURBOMACHINE

(71) Applicant: Safran Aircraft Engines, Paris (FR)

(72) Inventors: Stéphane Pierre Guillaume Blanchard, Moissy-Cramayel (FR); Youki Olivier Ito-Lardeau, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 413 days.

(21) Appl. No.: 15/320,378

(22) PCT Filed: Jun. 24, 2015

(86) PCT No.: PCT/FR2015/051699
§ 371 (c)(1),
(2) Date: Dec. 20, 2016

(87) PCT Pub. No.: WO2015/197980
PCT Pub. Date: Dec. 30, 2015

(65) Prior Publication Data
US 2017/0218781 A1    Aug. 3, 2017

(30) Foreign Application Priority Data
Jun. 26, 2014   (FR) ..................... 14 55997

(51) Int. Cl.
*F01D 5/08*   (2006.01)
*F01D 5/30*   (2006.01)
(Continued)

(52) U.S. Cl.
CPC ............ *F01D 5/3007* (2013.01); *F01D 5/02* (2013.01); *F01D 5/081* (2013.01); *F01D 5/12* (2013.01);
(Continued)

(58) Field of Classification Search
CPC ... F01D 5/02; F01D 5/12; F01D 5/081; F01D 5/3007; F01D 5/3015; F01D 11/00;
(Continued)

(56) References Cited

U.S. PATENT DOCUMENTS 2,851,246 A * 9/1958 Nichols .................... F01D 5/06
    415/136
3,918,842 A * 11/1975 Longley .................... F01D 5/22
    416/219 R
(Continued)

FOREIGN PATENT DOCUMENTS

FR       2 973 433 A1   10/2012
RU       2 373 402 C2    8/2006
WO    WO 2013/072605 A1  5/2013

*Primary Examiner* — Hieu T Vo
*Assistant Examiner* — Arnold Castro
(74) *Attorney, Agent, or Firm* — Blank Rome LLP

(57) ABSTRACT

The invention relates to a rotary assembly for a turbomachine, comprising:
  a disk (16) having an external periphery exhibiting an alternation of slots (22) and of teeth (20),
  vanes (14) extending radially from the disk (16), the roots (24) of which are engaged axially and retained radially in the slots (22) of the disk,
  upstream and/or downstream of the disk, an annular sealing flange (52) of cavities (36) formed radially between, respectively, the roots of the vanes and the bottoms of the slots of the disk, said flange comprising an external part (56) arranged axially facing the upstream and/or downstream ends, respectively, of the teeth of the disk and of the roots of the vanes.
According to the invention, the assembly further comprises an intermediate ring (66) which is arranged axially between the flange (52) and the teeth (20) of the disk, and also comprises a seal (70) which is arranged axially between, on
(Continued)

the one side, the intermediate ring (6) and, on another side, the teeth (20) of the disk and the vane roots (24).

13 Claims, 3 Drawing Sheets

(51) Int. Cl.
    *F01D 11/00*     (2006.01)
    *F01D 5/02*     (2006.01)
    *F01D 5/12*     (2006.01)

(52) U.S. Cl.
    CPC .......... *F01D 5/3015* (2013.01); *F01D 11/005* (2013.01); *F01D 11/006* (2013.01); *F05D 2220/32* (2013.01); *F05D 2260/30* (2013.01); *Y02T 50/676* (2013.01)

(58) Field of Classification Search
    CPC .... F01D 11/002; F01D 11/005; F01D 11/006; F16J 15/16; F16J 15/32; F16J 15/322; F16J 15/3204; F16J 15/3456; F05D 2260/30; F05D 2220/32; Y02T 50/676
    USPC ......... 415/174.2, 174.3, 170.1, 173.7, 174.5; 277/500, 551, 586, 587
    See application file for complete search history.

(56) References Cited

U.S. PATENT DOCUMENTS

| | | | | |
|---|---|---|---|---|
| 4,425,079 A * | 1/1984 | Speak | ................... | F01D 5/081 415/115 |
| 4,451,203 A * | 5/1984 | Langley | ................... | F01D 5/32 416/193 A |
| 4,580,946 A * | 4/1986 | Bobo | ................... | F01D 11/006 416/190 |
| 5,049,035 A | 9/1991 | Marlin | | |
| 5,158,305 A * | 10/1992 | Halling | ................... | F16L 17/06 277/591 |
| 5,257,909 A * | 11/1993 | Glynn | ................... | F01D 5/3015 416/219 R |
| 6,464,453 B2 * | 10/2002 | Toborg | ................... | F01D 5/081 415/115 |
| 6,884,028 B2 * | 4/2005 | Brauer | ................... | F01D 5/3015 415/173.7 |
| 7,217,089 B2 * | 5/2007 | Durocher | ............. | F01D 11/005 415/170.1 |
| 7,470,113 B2 * | 12/2008 | Tran | ................... | F01D 11/001 277/412 |
| 7,556,474 B2 | 7/2009 | Marchi | | |
| 7,789,619 B2 * | 9/2010 | Durand | ................. | F01D 11/122 415/173.1 |
| 8,079,807 B2 * | 12/2011 | Shapiro | ................. | F01D 25/246 415/173.1 |
| 8,105,041 B2 * | 1/2012 | Brillert | ................. | F01D 5/3015 416/220 R |
| 8,221,052 B2 * | 7/2012 | Tsutsui | ................. | F04D 29/321 415/143 |
| 8,376,697 B2 * | 2/2013 | Wiebe | ................... | F01D 11/005 415/173.7 |
| 8,388,309 B2 * | 3/2013 | Marra | ................... | F01D 5/025 415/171.1 |
| 9,726,033 B2 | 8/2017 | Gendraud et al. | | |
| 2012/0171022 A1 | 7/2012 | Hafner | | |
| 2016/0222810 A1 * | 8/2016 | Leduc | ................... | F01D 5/3015 |
| 2016/0237840 A1 * | 8/2016 | Leduc | ................... | F01D 5/3015 |
| 2017/0218785 A1 * | 8/2017 | Loiseau | ............... | F01D 11/005 |
| 2017/0350265 A1 * | 12/2017 | McLaughlin | ......... | F01D 25/246 |

* cited by examiner

ROTARY ASSEMBLY FOR A TURBOMACHINE

The invention relates to a rotary assembly for a turbomachine, such as in particular an aircraft jet engine, and a turbomachine including such an assembly.

Such an assembly, which can be found in particular in a turbine, comprises a disk, and vanes extending radially outwards from the disk and the roots of which are axially engaged into slots of the external periphery of the disk, and radially retained by teeth of the disk arranged in alternation with said slots. So-called slot bottom cavities are formed by spaces radially located between the roots of the vanes and the slot bottoms, and which axially extend in the downstream direction of the slots. Such slot bottom cavities particularly appear in rotation when the vanes are radially pressed outwards against the side bearing surfaces of the teeth of the disk, by centrifugal effects.

The vanes also comprise internal platforms circumferentially arranged end to end so as to define, together, the internal limit of the hot gas flow circulating in the turbine. The part of the vane located inside relative to the jet, i.e. between the internal platform and the root, is called a stilt. According to this provision, spaces are formed between two adjacent stilts, and form inter-stilt or inter-vane cavities.

By convention, upstream and downstream are to be considered along the X axis of the turbomachine along which a fluid mainly flows, in the downstream direction. Radial will mean radial relative to the axis X; axial will mean parallel to the axis X. The axis X is also the axis of the rotary assembly.

To improve the performances of the turbomachine, and to avoid heating of the disk by the flow of hot gases from an upstream combustion chamber and flowing through the jet, it is important to minimize the circulation of such gases through the slot bottom cavities, using sealing means. As a matter of fact, the part of the jet gas flowing into the slot bottom cavities does not participate in the rotational driving of the vanes and directly heats the disk. Arranging the sealing means upstream of the teeth of the disk and the roots of the vanes, which prevent the jet flow from reaching the slot bottom cavities is particularly advantageous.

For this purpose, using a sealing flange, usually a labyrinth ring, maintained at an internal portion, generally a radial annular wall, between the flanges of two successive disks in the turbine tying together the latter, is known. The disk flanges are conventionally supported by frustoconical walls extending radially inwards and axially on either side of the disks. The sealing flange generally comprises external seal lips intended to cooperate with portions of abradable material internally supported by circumferential rows of static vanes arranged through the jet axially alternating with the rotating vanes of the disks. The sealing flange also comprises one or two annular wall(s), or annular arm(s) extending outwards relative to the disk, from the internal portion of the flange to the teeth and the respectively upstream and/or downstream vane roots of the disks. The ends of such annular walls are annularly supported against the axial end faces of the teeth and of the vane roots of the respective disks. The sealing flange thus protects the disks and the slot bottom cavities from the jet hot flow.

However, this solution is not optimal and has the following defects.

In practice, the axial length of the roots of the vanes is different from the axial length of the teeth of the disk. A first axial clearance is thus formed between the respective axial ends of the roots of the vanes and of the teeth of the disk, due to both manufacturing and assembly tolerances of the vanes on the disk. In addition, in rotation, the annular walls of the sealing flange radially bend outwards about the point of attachment to the disks shown above. The ends of the annular walls of the flange then axially move away from the teeth of the disk and the roots of the vanes according to a second axial clearance, upon such bending. The jet air thus can circulate between the flange and the disk/vanes assembly, and circulate through the slot bottom cavities.

The present invention provides a simple, efficient and economical solution to the problem of sealing the slot bottom cavities, while avoiding the disadvantages of the prior art solutions.

For this purpose, it provides for a rotary assembly for a turbomachine, which comprises:

a disk having an external periphery having an alternation of slots and teeth, which extend in a downstream direction on the disk, vanes extending radially from the disk, and the roots of which are engaged axially in the slots and retained radially by the teeth of the disk, upstream and/or downstream of the disk, an annular sealing flange for sealing cavities formed radially between, respectively, the roots of the vanes and bottoms of the slots of the disk, with said flange comprising an internal part retained by the disk, and an external part arranged axially, facing upstream and/or downstream ends, respectively, of the teeth of the disk and of the roots of the vanes, characterized in that it further comprises an intermediate ring which is arranged axially between the flange and the teeth of the disk, and radially between the internal part and the external part of the disk, and in that it also comprises a seal which is arranged axially between, on the one side, the intermediate ring and, on the other side, the teeth of the disk and the roots of the vanes, with the intermediate ring and the sealing flange being so configured as to provide, in rotation, a sealing between, on the one side, the sealing flange and, on the other side, the teeth of the disk and the roots the vanes.

And to complete the sealing of the slot bottom cavities, it is even recommended:

for the intermediate ring to be preferably so configured as to cooperate in rotation, in annular support, with the flange, so as to then be axially forced toward the upstream and/or downstream ends, respectively, of the teeth of the disk and of the roots of the vanes, and/or for the seal to be preferably so configured as to cooperate, in rotation, in annular support with the intermediate ring so as then to be axially pressed against the upstream and/or downstream ends of the teeth of the disk and of the roots of the vanes, respectively.

Thus, in rotation, because of the centrifugal forces and thermal expansion of the flange, the external portion of the flange is axially spaced from the teeth of the disk and the roots of the vanes. However, the intermediate ring is supported on the flange and presses the seal against the teeth of the disk and the roots of the vanes. A complete sealing chain by annular contact is thus ensured between the flange on one side and the teeth of the disk and the roots of the vanes on the other side, through the intermediate ring and the seal.

In practice, the axial length of the roots of the vanes is different from the axial length of the teeth of the disk. An axial clearance is thus formed between the respective axial ends of the roots of the vanes and of the teeth of the disk, due to both manufacturing and assembling tolerances of the vanes on the disk. It appears that the invention makes it possible to use a conventional metal seal, with a small enough diameter to enable the seal to deform and to fit the shape accident constituted by the axial ends of the teeth and the roots of the vanes, so as to eliminate said above-mentioned clearance. The seal, in order to perform its function under the conditions described above, must in fact have a diameter greater than twice the cumulative total axial clearance. Sealing is therefore ensured.

Advantageously, the intermediate ring and the seal are slit and open radially, in rotation.

Thus, in rotation, the intermediate ring and the seal open and thus extend radially, and provide respective annular radial supports against the sealing flange and the intermediate ring, so as to optimize the sealing between these parts.

Advantageously, the sealing flange has an internal frustoconical surface axially inclined towards the disk and radially outwards, and arranged radially and axially facing the intermediate ring, which supports the intermediate ring in rotation. This internal frustoconical surface preferably extends up to the axial end of the sealing flange facing the teeth of the disk.

The radial support, in rotation, against such surface, is sealed, thanks to centrifugal effects and provides a mechanical reaction which pushes the intermediate ring axially toward the disk.

The intermediate ring preferably has an external frustoconical surface inclined axially towards the disk and radially outwards, and matching the frustoconical surface of the sealing flange.

The complementarity of the surfaces of the sealing flange and of the intermediate ring ensures a better annular contact and a better sealing between these parts.

Advantageously, the intermediate ring comprises an internal frustoconical surface inclined axially towards the disk and radially outwards and arranged radially opposite the seal, and which supports the seal in rotation. This internal frustoconical surface preferably extends up to the axial end of the intermediate ring facing the teeth of the disk.

The radial support against such a surface is sealed and provides a mechanical reaction which presses the seal axially against the teeth of the disk and the roots of the vanes.

According to another feature of interest, the seal is arranged in an annular groove downstream of the intermediate ring. This annular groove then comprises said internal frustoconical wall of the intermediate ring.

This groove holds the seal under all the conditions of operation of the assembly.

In a preferred embodiment, the seal has a diameter between 0.6 and 1.2 mm, and preferably between 0.8 and 1 mm. The seal may in particular be made of metal under these conditions.

This diameter is adapted to enable a metal seal to deform and fit the irregularities formed by the ends of the teeth of the disk and the roots of the vanes. Sealing is therefore optimized.

For a better sealing, the seal may be hollow. This shape coupled to a suitable size enables a better sealing as it allows a deformation which fits at best the surfaces of the teeth of the disk and of the roots of the vanes.

To ensure optimum operation, the maximum clearance between the axial ends of the roots of the vanes and the teeth of the disk, should be less than the thickness of the crushed hollow seal. For this purpose, a hollow seal with a total diameter of approximately 1 mm, with a central hollow portion with a diameter of about 0.8 mm can be used.

The intermediate ring and the seal are preferably arranged entirely outside the slot bottom cavities.

According to a particular embodiment, the internal portion of the sealing flange is arranged furthest upstream and/or downstream, respectively, than the external portion of the sealing flange.

Besides, with a split intermediate ring, an element for rotationally locking the intermediate ring around said axis (X) may be provided to ensure the rotational locking thereof relative to the sealing flange and/or the disk, with such element being preferably a portion projecting from one end of said external portion of the sealing flange and/or an axially projecting portion from an upstream radial wall of the disk, with said projecting portion being received in the slot of the intermediate ring.

The invention also relates to a turbomachine turbine comprising a rotary assembly as described in the present patent application.

The invention finally relates to a turbomachine, such as a turbojet or a turboprop, comprising a rotary assembly as described in the present patent application.

Other characteristics and advantages of the invention will appear upon reading the following description given by way of a non-restrictive example while referring to the appended drawings wherein.

Figure 4:
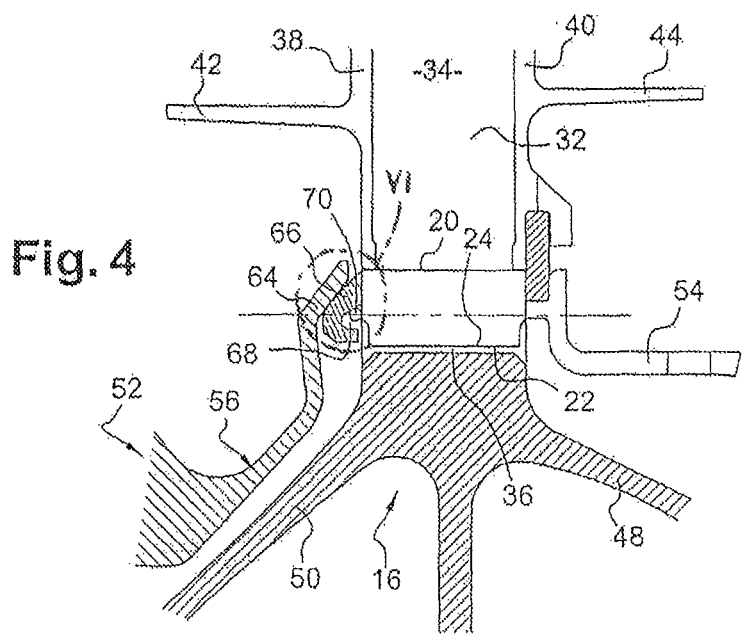
FIG. 4 is a schematic view in axial section of a rotary assembly according to the invention, in operation.
Figure 5:
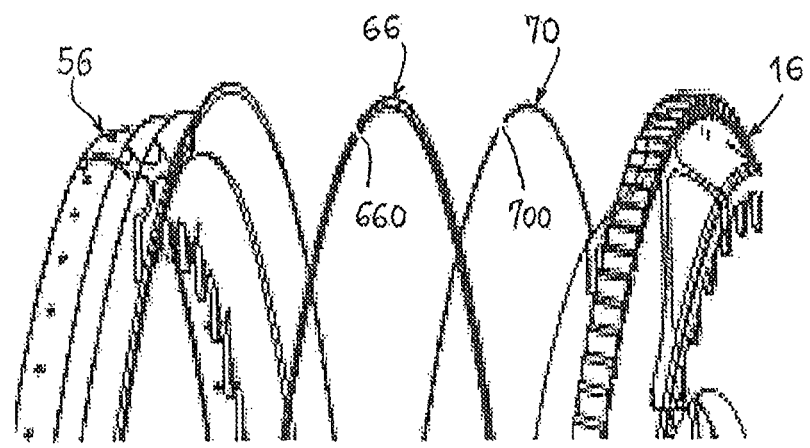
Figure 6:
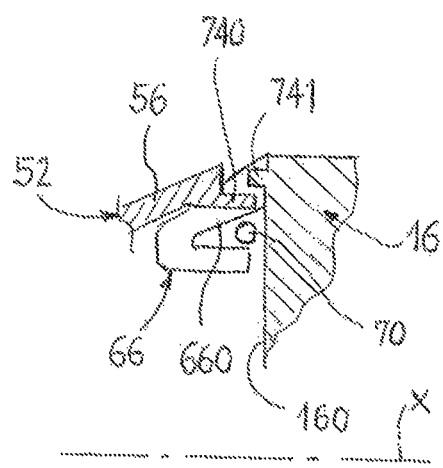

FIG. 5 more particularly shows the realization of the split structures of the intermediate ring and of the seal, and FIG. 6 is a modified detail of the area VI of FIG. 4, without vanes, in axial section.

Figure 1:
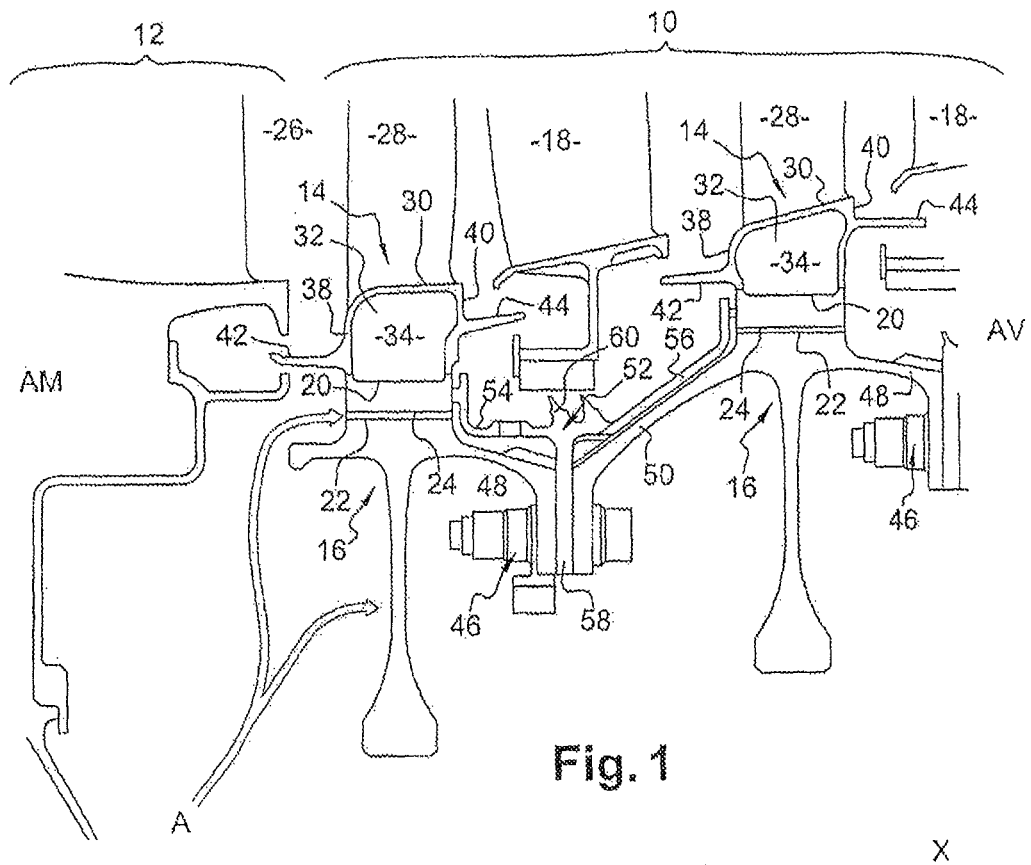
FIG. 1 is a partial schematic view, in axial cross-section, of a turbomachine low-pressure turbine according to the prior art.
Figure 2:
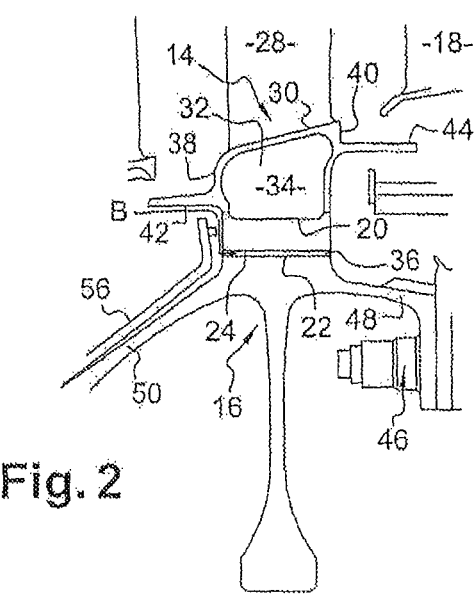
FIG. 2 is a partial schematic view, in axial cross-section, of a rotary stage of the turbine according to the prior art, in operation.

Reference is first made to FIGS. 1 and 2, which show a low-pressure turbine 10 according to the prior art, arranged downstream of a high-pressure turbine 12. The low-pressure turbine 10 includes an axial alternation of stages of annular rows of stationary vanes 18, called upstream guide vanes, and stages of rotary disks 16 comprising, at their peripheries, a plurality of vanes 14, with such stages being arranged about an axis X of the turbomachine.

In the present document, as in the technical field concerned, the terms upstream (AM) and downstream (AV) are defined so that upstream is located axially on the side where the general flow stream from the turbomachine comes from, and downstream is located axially on the side which the same stream flows from.

Each disk 16 comprises, at its external periphery, teeth (the apex of which is referenced 20) arranged in alternation with slots (the base of which is referenced 22) in which roots of the vanes are engaged axially and retained radially (the internal end of which is referenced 24), with such vanes 14 extending radially from the slots 22 into an annular flow jet 26 of a hot gas stream from an upstream combustion chamber (not shown).

More specifically, each vane radially comprises, from the outside towards the inside, a blade 28, a plat-form 30 extending substantially perpendicularly to the axis of elongation of the vane 14, and a stilt 32 connecting the plat-form to the vane root 24. The roots of the vanes 24 have, for example, the shape of a dovetail or the like so as to ensure the radial holding thereof in the slots 22. The platforms 30 of the vanes are arranged circumferentially end to end so as to define together the ideal internal limit of the flow stream of the hot gases flowing through the turbine. Under this provision, spaces are formed between circumferentially adjacent stilts 32, in the annular region extending radially from the platforms 30 up to the disk 16, and are called inter-stilt or inter-vane 34 cavities. So-called slot bottom cavities 36 are also formed by radial spaces separating the vane roots 24 and the bottoms of the slots 16 and open upstream and downstream of the disks 16. Walls 38, 40 radially extend inwards from upstream and downstream of the platforms to the roots of the vanes 24 and form axial sealing means of the annular area radially extending from the platforms 30 to the disk 16, and thus the inter-vane cavities 34, and ensures the closing thereof.

The upstream radial wall 38 of the platform is connected to a spoiler 42 extending upstream and the downstream radial wall 40 is connected to a spoiler 44 extending downstream. The spoilers 42, 44 axially extend between the consecutive stages of the turbine so as to partially preserve the structural integrity of the jet 26 between each turbine stage, thereby limiting the flow of hot gases radially toward the inside of the turbine.

The disks are fixed together by bolting, at 46, annular flanges 48, 50 axially extending towards each other from each disk. A labyrinth ring 52, also called a sealing flange, is also axially positioned between each pair of adjacent disks 16 and comprises, in an external part, two annular walls, or upstream and downstream annular arms 54, 56 axially extending up to such disks. The ends of the annular arm are so positioned as to have an annular axial support against the teeth of the disk and the roots of the vanes, outside the slot bottom cavities, so as to prevent the jet gases from radially flowing inwards along the teeth of the disks, and thus from reaching the slot bottom cavities. The mounting flanges 48, 50 between the disks are thus also protected from the jet gases by the arms 54, 56 of the labyrinth ring 52 covering same on the outside. The labyrinth ring 52 further comprises, in an internal part, an internal radial annular wall 58 for the fixing to the bolts 46 of the flanges 48, 50 of the disks, and cooperates with the internal ends of the vanes 18 of the upstream guide vanes through external annular lips 60, in order to limit the axial flow of jet gases inwards relative to such vanes 18.

To ensure the correct operation of the turbomachine, cooling air A is taken off, from a low-pressure or high-pressure compressor for example, and routed through the internal part of the turbine, to the annular space radially formed between on the one hand the flanges 48, 50 of the disk and on the other hand the arms 54, 56 of the labyrinth rings, up to the slot bottom cavities 36 in order to provide cooling of the disk 16 and to protect the latter from heating caused by the hot gases from the jet flow 26. In order to allow the circulation of the cooling air A downstream of the slot bottom cavities 36, the latter open downstream inwards relative to the arm 54 of the labyrinth ring 52 which is axially supported by the disk 16. Such configuration makes it possible for the cooling air A to radially flow further downstream between the labyrinth ring 52 and the attachment flanges 48, 50 between the disks 16 so as to also provide cooling thereof.

In operation, as shown in FIG. 2 and explained above in this document, the annular arms 54, 56 of the labyrinth rings 52 bend outwards and axially move away from the teeth 20 of the disks and the roots of the vanes 24, which makes it possible for the jet hot gases to radially flow from inside along the upstream and downstream faces of the teeth 20 of the disks, and to reach the disk 16 and the slot bottoms cavities 36. The prior art, in order to limit this phenomenon, may form annular hooks (not shown) upstream and downstream of the stilts, which are used to axially hold the ends of the arms of the labyrinth ring in the vicinity of the teeth of the disks, by preventing such ends from moving too far away from the disks. However, this solution only limits the problem, and does not solve it.

Figure 3:
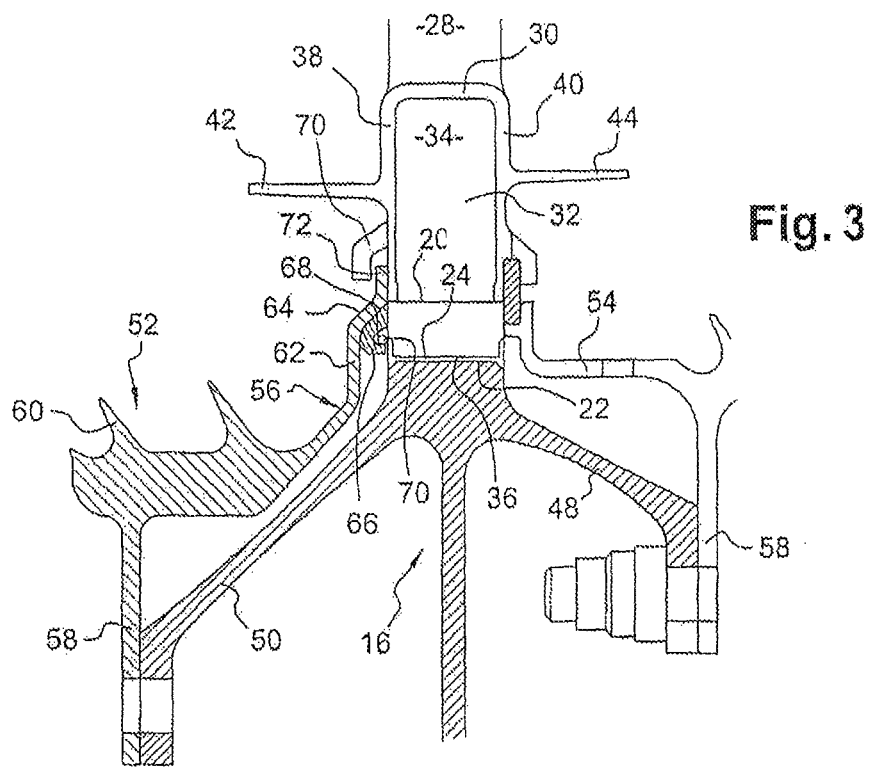
FIG. 3 is a schematic axial sectional view of a rotary assembly of the invention.

The proposed solution, according to the features mentioned above in the present application, is shown in FIGS. 3 and 4.

In the embodiment shown, the sealing means according to the invention are formed upstream of the slot bottom cavities. Such sealing means may equally and symmetrically be positioned downstream of these cavities.

Thus, referring to FIG. 3, the downstream end of the downstream arm 56 of the labyrinth ring 52 comprises a radial wall 62 extended outside by a frustoconical wall 64 inclined radially outwards and axially in the downstream direction, and the external annular end of which is, at rest, in contact with the upstream end faces of the teeth 20 of the disk and roots of the vanes 24, disregarding the alignment clearance between the latter parts. This contact more particularly occurs radially with respect to the external ends of the teeth 20 of the disk.

A preferably slit (slot 660 of FIG. 5) intermediate ring 66 is axially arranged between the downstream end of the downstream arm 56 of the labyrinth ring 52 and the teeth 20 of the disk. It will advantageously be dimensioned so as to be in contact with the latter, at rest. This intermediate ring comprises upstream and external surfaces having shapes matching that of the downstream end 62, 64 of the downstream arm 56 of the labyrinth ring, i.e. respectively radial and frustoconical, inclined radially outwards and axially in the downstream direction. The downstream face of the intermediate ring 66 is radially flat so as to provide a correct axial support against the teeth 20 of the disk and the roots of the vanes 24, and has an annular axial groove 68 with a frustoconical external surface inclined in the downstream direction and outwards. The internal end of the intermediate ring 66 is still radially located outside the slot bottom cavities 36.

In a form-fitting manner, the contact between the intermediate ring 66 and the arm 56 of the labyrinth ring 52 is optimum, which ensures a tight sealing between these two parts. In addition, when rotating, the intermediate ring 66 tends to radially open, as a result of centrifugal forces, which, because of the mechanical reaction of a radial support on the frustoconical wall 64 of the arm 56, axially forces the intermediate ring 66 towards the teeth 20 of the disk.

An element 74 for rotationally locking the intermediate ring may advantageously be provided for. This rotational locking element may, as schematically shown in FIG. 6, be a portion 740 projecting from the end of the arm 56 of the labyrinth ring 52 and/or that of a portion 741 axially projecting from the upstream radial wall 160 of the disk 16. This projecting element will be favourably received in the slot 660 of the intermediate ring, in order to ensure the rotational locking of the intermediate ring relative to the labyrinth ring and to the disk.

A preferably slit (slot 700 of FIG. 5) seal 70 (see FIGS. 3,4), is arranged in the groove 68 of the intermediate ring. The seal 70 will advantageously have a diameter between 0.6 and 1.2 mm, and preferably between 0.8 and 1 mm. This seal 68 may be hollow and also adapted to another type of material. The seal 70 will be a priori made of metal.

As illustrated in FIG. 4, in operation, and similarly to the prior art, the arm 56 of the labyrinth ring 52 flexes and axially moves away from the teeth 20 of the disk. However, the mechanical reaction of a radial support between the intermediate ring 66 and the frustoconical wall 64 of the arm 56 still occurs, and makes the intermediate sealing ring 66 sealingly slide along the frustoconical wall 64 of the arm, in the downstream direction, so as to remain axially against the teeth 20 of the disk, the groove 68 facing the teeth 20 of the disk and the roots of the vanes 24.

In operation, the seal 70 opens and, because of the mechanical reaction of a radial support on the external wall of the frustoconical groove 68 of the intermediate ring 66, axially presses the seal 70 against the teeth 20 of the disk and the roots of the vanes 24. The seal 70 is thus supported both annularly on the one hand against the intermediate ring 66 and on the other hand against the teeth 20 of the disk and the roots of the vanes 24, and thus provides sealing of these two parts.

The seal 70 can thus provide the same function and has the same efficiency in the groove 68, whether the arm 56 of the labyrinth ring is bent or not. Besides, the arm/intermediate ring, intermediate ring/seal and seal/teeth of the disk and roots of the vanes sealing is ensured under all the operating conditions.

Similarly to the prior art, an annular hook 72 oriented upstream and inwards can be formed on the upstream radial wall 38 of the plat-form, around a radial rim 72 formed at the end of the arm 56 of the labyrinth ring 52. This hook prevents the arm 56 from axially deviating too far in the upstream direction when bending in rotation.

The invention claimed is:

1. A rotary assembly for a turbomachine having an axis and comprising:
    a disk having an external periphery having an alternation of slots and of teeth, which extend in a downstream direction on the disk,
    vanes extending radially from the disk, and roots of which are engaged axially in the slots and retained radially by the teeth of the disk,
    upstream and/or downstream of the disk, an annular flange for sealing cavities formed radially between, respectively, the roots of the vanes and bottoms of the slots of the disk, with said flange comprising an internal part retained by the disk, and an external part arranged axially, facing upstream and/or downstream ends, respectively, of the teeth of the disk and of the roots of the vanes,
    an intermediate ring which is arranged axially between the flange and the teeth of the disk, and radially between the internal part and the external part of the disk, and
    a seal which is arranged axially between, on the one side, the intermediate ring and, on the other side, the teeth of the disk and the roots of the vanes,
    with the intermediate ring and the sealing flange being so configured as to provide, in rotation, a sealing between, on the one side, the sealing flange and, on the other side, the teeth of the disk and the roots of the vanes.

2. A rotary assembly according to claim 1, wherein the intermediate ring and the seal are slit and open radially in rotation.

3. A rotary assembly according to claim 1, wherein the sealing flange has an internal frustoconical surface inclined axially towards the disk and radially outwards and arranged axially and radially facing the intermediate ring.

4. A rotary assembly according to claim 3, wherein the intermediate ring has an external frustoconical surface inclined axially towards the disk and radially outwards, and matching the frustoconical surface of the sealing flange.

5. A rotary assembly according to claim 1, wherein the intermediate ring comprises an internal frustoconical surface inclined axially towards the disk and radially outwards and arranged radially facing the seal.

6. A rotary assembly according to claim 1, wherein the seal is arranged in an annular groove downstream of the intermediate ring.

7. A rotary assembly according to claim 1, wherein the seal has a diameter between 0.6 and 1.2 mm.

8. A rotary assembly according to claim 1, wherein the intermediate ring and the seal are arranged entirely outside the slot bottom cavities.

9. A rotary assembly according to claim 1, wherein the intermediate ring is so configured as to cooperate, in rotation, in annular support with the flange so as to be then axially forced toward the upstream and/or downstream ends of the teeth of the disk and the roots of the vanes, respectively.

10. A rotary assembly according to claim 1, wherein the seal is so configured as to cooperate, in rotation, in annular support with the intermediate ring so as then to be axially pressed against the upstream and/or downstream ends, respectively, of the teeth of the disk and the roots of the vanes.

11. A rotary assembly according to claim 2, which comprises an element for locking in rotation the intermediate ring about said axis, with said element preferably being formed as a portion projecting from one end of said external portion of the sealing flange or as a portion axially projecting from an upstream radial wall of the disk, with said projecting portion being received in the slot of the intermediate ring to ensure the locking in rotation of the ring relative to the labyrinth ring and to the disk.

12. A turbine for a turbomachine, comprising a rotary assembly according to claim 1.

13. A turbomachine such as a turbojet or a turboprop, comprising a rotary assembly according to claim 1.

* * * * *